G. N. TSUMURA.
ANIMAL TRAP.
APPLICATION FILED NOV. 26, 1913.

1,098,064.

Patented May 26, 1914.
2 SHEETS—SHEET 1.

WITNESSES:
A. A. Stock
Harry A. Totten

INVENTOR
George N. Tsumura
BY
Acker & Totten
ATTORNEYS

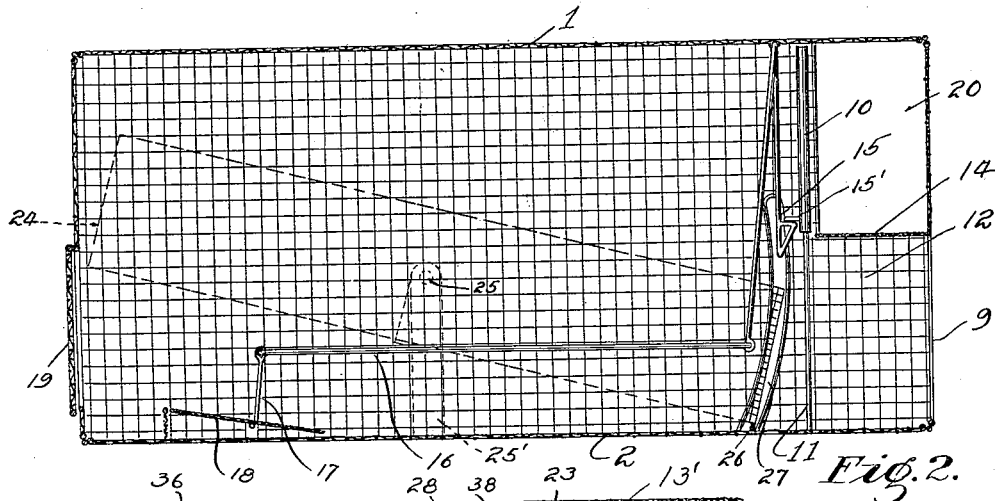
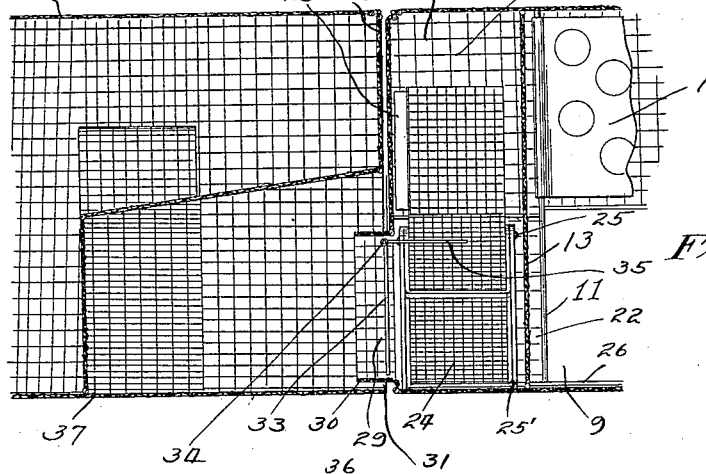
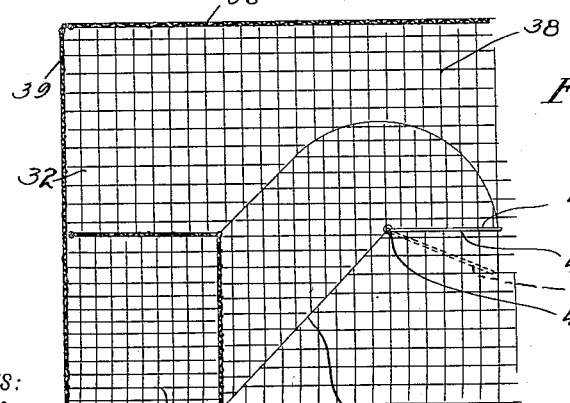

UNITED STATES PATENT OFFICE.

GEORGIE NAOSUKE TSUMURA, OF MOUNTAIN VIEW, CALIFORNIA.

ANIMAL-TRAP.

1,098,064. Specification of Letters Patent. Patented May 26, 1914.

Application filed November 26, 1913. Serial No. 803,287.

*To all whom it may concern:*

Be it known that I, GEORGIE NAOSUKE TSUMURA, a subject of the Emperor of Japan, residing at Mountain View, in the county of Santa Clara and State of California, have invented certain new and useful Improvements in Animal-Traps, of which the following is a specification.

The present invention relates to an improved trap for the catching of animals and more particularly for the catching of ground squirrels, which are very numerous and bothersome in this section of the country.

The invention has for its principal objects to provide a trap of the cage type, formed of open mesh material, and which is constructed in sections and each section is foldable to permit the same to be folded into a small compass for storage or shipment; one provided with a main trap door which is closed and operated to open by the animal trapped; and one in which the animal retaining section is capable of being removed from the trapping section to destroy the animal trapped therein.

With the above mentioned and other objects in view, the invention consists in the novel construction and combination of parts hereinafter described, illustrated in the accompanying drawings and pointed out in the claims hereto appended; it being understood that various changes in the form, proportion, size and minor details of construction within the scope or the appended claims may be resorted to without departing from the spirit or sacrificing any of the advantages of the invention.

To more fully comprehend the invention reference is directed to the accompanying drawings, wherein—

Figure 1:
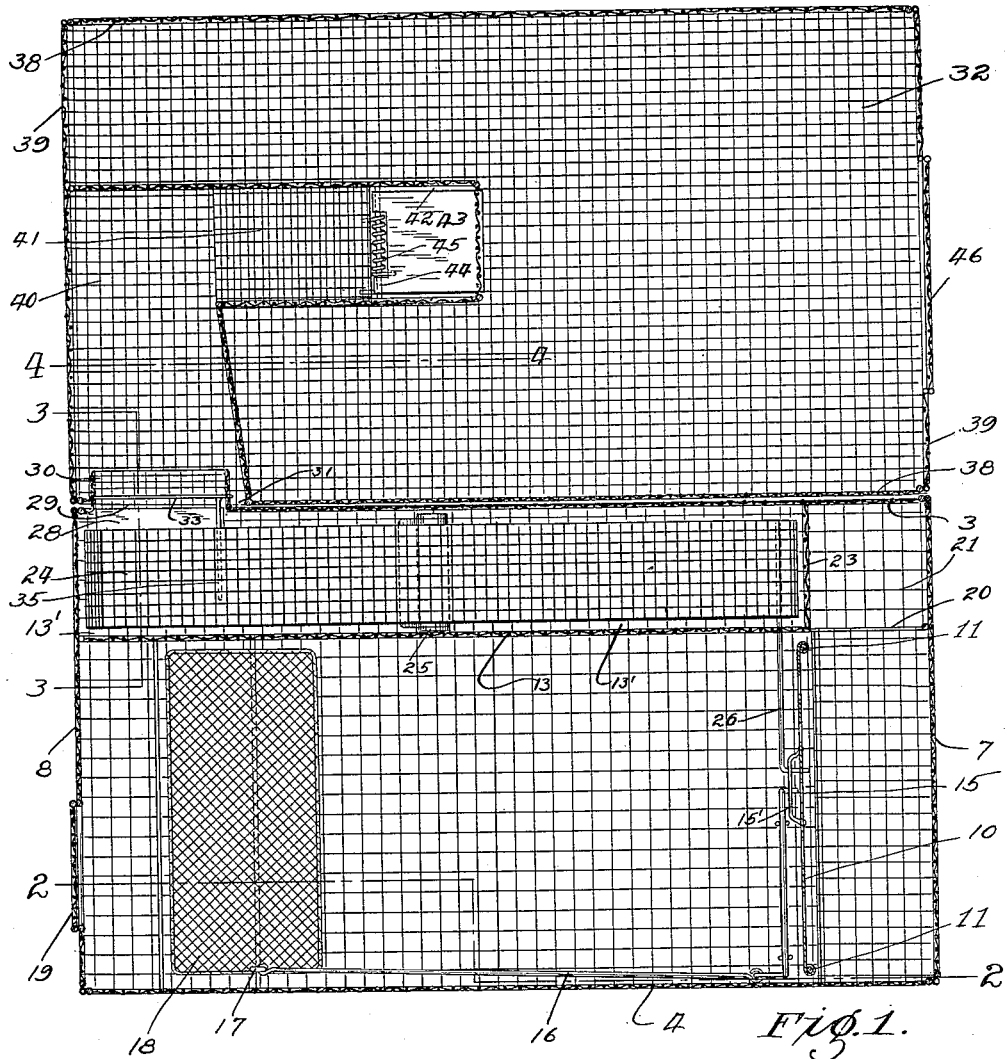
Figure 5:
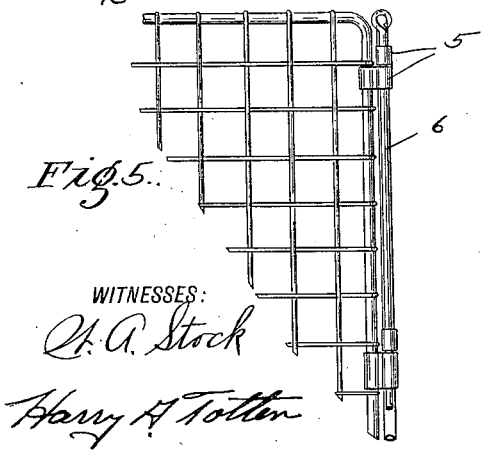
Figure 6:
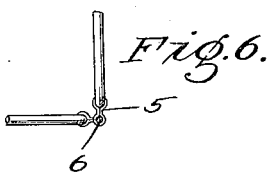

Figure 1 is a top plan view of the trapping and receiving cages positioned relative to each other and with their top walls removed. Fig. 2 is a sectional view on line 2—2 of the trapping cage in Fig. 1. Fig. 3 is a sectional view taken on line 4—4 of the receiving cage in Fig. 1. Fig. 4 is a sectional view taken on line 3—3. Fig. 5 is a detail view of the means for securing the walls of the respective cages together. Fig. 6 is a plan view disclosing the manner of securing the walls of the respective cages together.

Referring more particularly to the drawings wherein like characters of reference designate corresponding parts throughout the several views, the numerals 1, 2, 3 and 4 designate respectively the top, bottom and side walls of a trapping cage, preferably constructed of heavy screen material, and from the peripheral edges of each wall project the hooked members 5 (in Fig. 6), which, when the walls are assembled, aline and are adapted to receive the securing rods 6 which lock the walls in position. Front and rear walls 7 and 8, each carrying hooked members 5 are positioned over the ends of the trapping cage and are also secured to the top, bottom and side walls by rods 6. An entrance 9 is formed in the lower portion of one side of the front wall 7 and the same is controlled by a vertically sliding gate 10, mounted on standards 11, positioned in rear of the front opening, and the space surrounding the opening between the front opening 9 and the gate is bounded on the bottom and one side by the cage bottom and one side wall, and at the opposite side by the portion 12 of a wall 13 extending the full length of the cage, which provides a compartment 13', and on the top by the partition 14 which extends from the cage side wall to the portion 12 of the partition 13 (Figs. 1 and 2).

The gate is normally retained in its elevated position above the entrance 9 by a pivotal catch 15 (Fig. 2), one end of which engages a projection 15' on the rear of the gate and the opposite end thereof is connected by a link 16 with an arm 17 of a pivoted trip board 18, over which the animal must pass in order to obtain the bait placed in the rear of the trapping cage through the door 19 in the rear thereof. The animal in crossing the trip board will cause the rear end thereof to be depressed, which will release the catch 15 from the projection 15' and permit the gate to drop by gravity. The closing of the gate will permit the animal to have access to the upper side of the partition 14, which communicates by a passage 20 with a compartment 21 at one side of the entrance opening, and this compartment communicates through a suitable opening 22 (Fig. 4) in the front wall 23 thereof with the forward open end of a tubular runway 24 (Figs. 1 and 2) positioned in the compartment 13' and pivoted within its length, as at 25, to a bracket 25', and carrying at its forward end a weighted arm 26 which operates through a curved slot 27 in the wall 13 and normally rests on the bottom of the trapping cage below the gate 10. The animal passing from the partition 12 through the passage into the compartment 21 sees the opening 22 and passes into the tubular runway 24, and after passing the pivotal point thereof, the weight of the animal will cause the rear end of the runway to be depressed and the front end to rise. The rising of the front end of the runway will cause the arm 26 to elevate the gate 10 to a position that the projection 15' will be engaged by the catch 15, and when the front end of the runway is raised, the same is closed by the upper portion of the wall 23. Should the animal after entering the tubular runway refuse to go the full length thereof, and return to the compartment 21, it will be prevented from passing into the trapping cage by the gate 10 which is in its elevated position.

The rear end of the runway is closed and in the outer side wall adjacent said closed end is formed an outlet opening 28 (Fig. 4), which, when the rear end of the runway is depressed registers with a corresponding opening 29 formed in the side wall 3 of the cage, and said opening is provided with an outwardly projecting flanged portion 30 which is adapted to project into a similar opening 31 in the lower side wall of a receiving cage 32. The opening 29 is normally closed by an outwardly swinging door or gate 33, pivoted at its upper end, as at 34, to the upper portion of the side walls of said flange 30, and an actuating rod 35 is extended at right angles from the gate adjacent its pivotal point and projects under the rear end of said runway. It will be apparent that when the rear end of the runway is depressed the rod 35 will be engaged thereby and depressed, thus automatically raising the gate 33 to permit the animal to pass through the openings 29 and 31 into the receiving cage 32.

The receiving cage which is constructed separately from the trapping cage is formed with top, bottom, side, and end walls 36, 37, 38 and 39, and each are formed on their outer edges with the hooked members 5 which are alined when the walls are assembled and are secured together by the rods 6 which permits the cage to be taken apart for storage or shipment. A runway 40 (Figs. 1, 3 and 4) having an upwardly inclined terminal 41 communicates with the opening 31 and said runway is formed in the end of the bottom wall of said inclined portion with an outlet opening 42 which is normally closed by a downwardly swinging gate 43 pivoted as at 44 and normally retained in its elevated position by the spring 45. As soon as the weight of the animal is removed from the rear end of the tubular runway, the weighted rod at the forward end thereof will cause the same to incline in the opposite direction and the weight of the runway being released from the rod 35 will permit the gate 33 to close the opening 29, and the animal will be confined in the runway 40 and as its attention is drawn to the interior of the cage by an animal that is always confined therein as a lure, it will pass up the incline 41 and on encountering the gate 43, the same will give to the weight of the animal and let the animal pass into the receiving cage. A gate 46 is formed in the end wall of the receiving cage to permit the trapped animals to be removed therefrom.

Ground squirrels being of the approximate size of the well known tree squirrel necessitates the constructing of the trapping and receiving cages in large sizes, which are quite heavy, and as a number of the animals are caught each day, where the same are plentiful, it would require a conveyance to carry the entire structure to a place where the animals could be despatched and it is to overcome this objection that I construct the trapping and receiving cages separately, that the receiving cage with the animals therein may be readily conveyed to a suitable point for the despatching of the animals without the necessity of also carrying the heavy trapping cage.

When the cages are positioned beside each other, the same may be secured together by any suitable binding means to prevent dogs or other large animals from separating the same.

The lure confined in the retaining cage will attract the attention of the animals toward the cages, and an animal confined in the retaining cage becomes very tame and materially assists in attracting the other animals thereinto, and when the animals that have been trapped are destroyed, one or two animals are always permitted to remain in the confining cage as a lure.

The gate 10 being set to be engaged by the trigger 16, the device operates in the following manner:—The animal having entered the entrance opening 9 steps on the trip board 18, in its endeavor to reach the bait at the rear of the cage, and the weight of the animal causes the trip board to pivot which releases the trigger from its projection 15' and this permits the gate 10 to fall by gravity and close the entrance opening 9. The dropping of the gate 10 will permit the animal to have access to the forward end of the runway 24 through the passage and opening 22, and the animal passing to the rear end of the runway will raise the gate 10, which will be again engaged by the trigger 15 and retained in its elevated position. The gate will also prevent the return of the animal from the runway 24 into the trapping cage; the tilting of the rear end of the runway 24 will cause the gate 23 to open and permit the animal to pass into the runway 40, and as the animal's weight is removed from the rear end of the runway, the same will move upwardly and permit the gate 33 to close. The animal is now confined in the runway 40 and on passing up the incline 41 encounters the gate 43 which gives under weight and permits the animal to drop into the retaining cage where it is confined until disposed of.

Having thus described my invention what I claim is:—

1. In a trap of the class described, the same comprising a cage provided with an entrance opening, a pivoted runway mounted therein and communicating at one end with an outlet opening in said cage, a dividing wall forming an entrance chamber and a runway within the cage and said wall provided with an opening connecting said entrance chamber and the opposite end of said runway, a movable gate adapted when in its normal position to uncover said entrance opening and to cover the opening in said dividing wall and when in another position to uncover the opening in said dividing wall and cover said entrance opening, a trigger means for normally retaining said gate in its normal position and operated by the animal on entering the cage to release the gate to permit the same to assume the second mentioned position, means operated on the tilting of said runway toward said outlet opening for restoring said gate to its normal position, and a receptacle associated with said outlet opening for receiving the animals passing therefrom.

2. In a trap of the class described, the same comprising a cage provided with an entrance opening, a tubular runway pivotally mounted within the cage and communicating at one end with an outlet opening in said cage, a dividing wall within the cage forming an entrance chamber and providing a compartment within which the runway is mounted, said wall provided with an opening connecting said entrance chamber with said compartment at the opposite end of said runway, a sliding gate adapted when in its normal position to uncover said entrance opening and to cover the opening in said dividing wall and when in another position to uncover the opening in said dividing wall and cover said entrance opening, a trigger for normally retaining said gate in its normal position, a pivoted platform associated with said trigger and operated by an animal entering said cage for actuating said trigger to permit the gate to assume the second mentioned position, means operated on the tilting of said runway toward said outlet opening for restoring said gate to its normal position to be engaged by said trigger, a normally closed gate controlling said outlet opening and actuated to open on the tilting of said runway toward said outlet opening, and a receptacle associated with said outlet opening for receiving and confining the animals passing therefrom.

3. In a trap of the class described, the same comprising a trapping cage and a retaining cage for positioning adjacent each other said trapping cage provided with an entrance opening and an outlet opening, a wall in said cage dividing the same into an entrance chamber and a runway compartment, one communicating with each opening, and said wall provided with an opening therein to connect the entrance chamber with the runway compartment, a tubular runway pivotally mounted in said runway compartment and adapted to communicate at its opposite ends with said outlet opening and opening in said dividing wall, a gate for controlling said entrance and dividing wall opening, means controlled by the weight of an animal within said cage for operating said gate relative to said openings, a runway in said retaining cage communicating with the outlet opening of said trapping cage, and a pressure controlled gate in said runway communicating with the interior of said retaining cage.

4. In a trap of the class described, the same comprising a cage having separable side walls and provided with an entrance opening and an outlet opening, a wall in said cage dividing the same into an entrance chamber and a runway compartment, one communicating with each opening, said wall provided with an opening therein to connect the entrance chamber with the runway compartment, a tubular runway pivotally mounted in said runway compartment and adapted to communicate at its opposite ends with said outlet opening and said opening in said dividing wall, a slidable gate for controlling said entrance and dividing wall openings, means controlled by the weight of an animal within said cage for controlling the operation of said gate relative to said openings, a gate controlling said outlet opening and controlled by the operation of said pivoted runway, and a receptacle associated with said outlet opening for receiving and confining the animals passing therethrough.

5. In a trap of the class described, the same comprising a cage having separable side walls and provided with an entrance opening and an outlet opening, a dividing wall in said cage dividing the same into an entrance chamber and a runway compartment, one communicating with each opening and said wall provided with an opening therein to connect the entrance chamber and runway compartment, a tubular runway pivotally mounted in said runway compartment and adapted to communicate at its opposite ends with said outlet opening and said opening in said dividing wall, a slidable gate for controlling said entrance and dividing wall openings, means controlled by the weight of an animal within said cage for controlling the operation of said gate relative to said openings, and a receptacle associated with said outlet opening for receiving and confining the animals passing therethrough.

In testimony whereof I have signed my name to this specification in the presence of two subscribing witnesses.

GEORGIE NAOSUKE TSUMURA.

Witnesses:
HARRY A. TOTTEN,
S. NAKATAU.

Copies of this patent may be obtained for five cents each, by addressing the "Commissioner of Patents, Washington, D. C."